US006998050B2

(12) United States Patent
Nakajoh et al.

(10) Patent No.: US 6,998,050 B2
(45) Date of Patent: Feb. 14, 2006

(54) METHOD OF TREATING FATS AND OILS

(75) Inventors: Katsuhiko Nakajoh, Kanagawa-ken (JP); Takehiko Muramatsu, Kanagawa-ken (JP); Yukishige Maezawa, Tokyo (JP); Masao Kon, Kanagawa-ken (JP); Tomohiro Todoroki, Kanagawa-ken (JP); Katsushi Nishizawa, Tokyo (JP); Atsushi Ohara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 115 days.

(21) Appl. No.: 10/358,335

(22) Filed: Feb. 5, 2003

(65) Prior Publication Data

US 2003/0175401 A1 Sep. 18, 2003

(30) Foreign Application Priority Data

Feb. 5, 2002 (JP) ............................ 2002-028370
Feb. 5, 2002 (JP) ............................ 2002-028371

(51) Int. Cl.
*B01D 11/00* (2006.01)
*C11B 3/10* (2006.01)

(52) U.S. Cl. ................ 210/634; 208/262.1; 208/262.5; 210/679; 210/680; 210/749; 210/806; 210/908; 426/417; 554/191; 554/206

(58) Field of Classification Search ............ 208/262.1, 208/262.5, 263; 210/634, 638, 679, 680, 210/690, 749, 806, 908, 502.1, 757, 758; 426/417; 554/191, 206
See application file for complete search history.

(56) References Cited

U.S. PATENT DOCUMENTS

| | | | | |
|---|---|---|---|---|
| 3,951,859 | A * | 4/1976 | Inaba et al. | 502/62 |
| 4,387,018 | A | 6/1983 | Cook et al. | |
| 4,405,448 | A | 9/1983 | Googin et al. | |
| 4,430,208 | A | 2/1984 | Pytlewski et al. | |
| 4,477,354 | A | 10/1984 | Fessler | |
| 4,764,256 | A | 8/1988 | Way | |
| 5,077,070 | A * | 12/1991 | Regutti | 426/417 |
| 5,476,987 | A * | 12/1995 | Kitamura et al. | 585/853 |
| 5,648,499 | A * | 7/1997 | Tanimoto et al. | 548/316.4 |
| 5,750,026 | A * | 5/1998 | Gadkaree et al. | 210/502.1 |
| 6,638,551 | B1 * | 10/2003 | Levy et al. | 426/330.6 |
| 6,764,603 | B1 * | 7/2004 | Buijtenhuijs et al. | 210/671 |

FOREIGN PATENT DOCUMENTS

| | | |
|---|---|---|
| GB | 1535481 | * 12/1978 |
| JP | 63-39991 | * 2/1988 |
| WO | WO 94/03249 | * 2/1994 |

OTHER PUBLICATIONS

Derwent Translation of JP 63-39991.*

* cited by examiner

*Primary Examiner*—Joseph Drodge
(74) *Attorney, Agent, or Firm*—Oblon, Spivak, McClelland, Maier & Neustadt, P.C.

(57) ABSTRACT

The present invention provides a method of treating fats and oils containing low concentrations of aromatic halogen compounds and other contaminants by contacting the fats or oils with an adsorbing agent. The adsorbing agent contains a porous body and a non-protonic polar solvent held in the interiors of fine pores in the porous body to adsorb the contaminants. In one embodiment, the porous body also carries noble metal fine particles. In another embodiment, the adsorbing body comprises a solid acid for adsorbing the contaminants and there is a step of contacting the adsorbing body with an organic solvent to extract the adsorbed contaminants into the organic solvent.

15 Claims, 3 Drawing Sheets

METHOD OF TREATING FATS AND OILS

CROSS-REFERENCE TO RELATED APPLICATIONS

This application is based upon and claims the benefit of priority from the prior Japanese patent applications No. 2002-28370 filed on Feb. 5, 2002, and Japanese patent application No. 2002-28371 filed on Feb. 5, 2002; the entire contents of which are incorporated herein by reference.

TECHNICAL FIELD

The present invention relates to a method of treating fats and oils, in particular, a method of treating a contaminated oil which is suitable for selectively adsorbing and separating persistent organic pollutants from fats and oils containing pollutants.

BACKGROUND ART

Persistent organic pollutants (POPs) such as polychlorinated biphenyls (PCB) have the volatile migration, are present in a wide range of the concentration in various environmental media, are known as a material influencing on the human body, and PCB is required to be removed and rendered harmless. In order to effectively treat persistent organic pollutants having the characteristics)by a combusting method and a chemical treating method, it becomes important to selectively separate and recover only persistent organic pollutants from environmental media in which those pollutants are present. In particular, in treatment of organic pollutants present in waste oils such as fats and oils at the low concentration of ppm order, since it is difficult to selectively separate and recover organic pollutants having the high affinity with media, a substantial amount of pollutants to be used becomes immense, being extremely ineffective from a viewpoint of energy.

Previously, as a method of selectively separating and recovering organic pollutants which are lipophilic materials from fats and oils contaminated with organic pollutants, an evaporating method and a liquid-liquid extracting method are widely used.

This evaporating method utilizes a difference in boiling points of 2 or more materials in order to separate a mixture of those materials as is well known. However, since, in mineral oils which are fats and oils to be treated have boiling points close to those of aromatic halogenated compounds which are representative pollutants, it is difficult to recover aromatic halogenated compounds from fats and oils at a high precision.

In addition, a liquid-liquid extracting method is to separate and remove pollutants by transferring pollutants from fat and oils into non-protonic polar solvents by a first step of extracting aromatic halogenated compounds or pollutants dissolved in fats and oils (liquid) into non-protonic polar solvents, and a second step of separating fats and oils and non-protonic polar solvents containing the extracted aromatic halogenated compounds, for example, disclosed in U.S. Pat. No. 4,405,448.

However, in the second step, since two liquids can not be separated simply, there is a problem that an amount of aromatic halogenated compounds-remaining fats and oils becomes large, fats and oils are mixed into separated non-protonic polar solvents, and it is difficult to perform separating treatment at a high precision.

DISCLOSURE OF THE INVENTION

An object of the present invention is to provide a method of treating fats and oils, which separates fats and oils such as mineral oils containing aromatic halogenated compounds such as polychlorinated biphenyls at the low concentration, into fats and oils and aromatic halogenated compounds, simply and at a high precision.

That is, a first present invention is a method of treating a contaminated oil, which comprises contacting an adsorbing agent comprising a porous body and a non-protonic polar solvent held in the interior of fine pores of a porous body, with contaminated fats and oils containing organic pollutants, and adsorbing the pollutants in the non-protonic polar solvent in the porous body.

In addition, a second present invention is a method of treating fats and oils, which comprises an adsorbing step of contacting fats and oils containing aromatic halogenated compounds of pollutants with an adsorbing agent comprising a solid acid to adsorb the aromatic halogenated compounds onto the adsorbing agent, and a step of contacting the adsorbing agent with an organic solvent to extract the aromatic halogenated compounds adsorbed onto the adsorbing agent into the organic solvent.

In the second present invention, it is desirable that the solid acid is at least one selected from metal oxide, metal silicon composite compound, metal sulfide, metal chloride, sulfate, phosphate, silicate, synthetic zeolite (molecular sieve), silica gel, heteropolyacid, active carbon, clay mineral, $H_3PO_4$-containing diatomaceous earth and cationic exchange resin.

BEST MODE FOR CARRYING OUT THE INVENTION

[Regarding First Invention]

Figure 1:
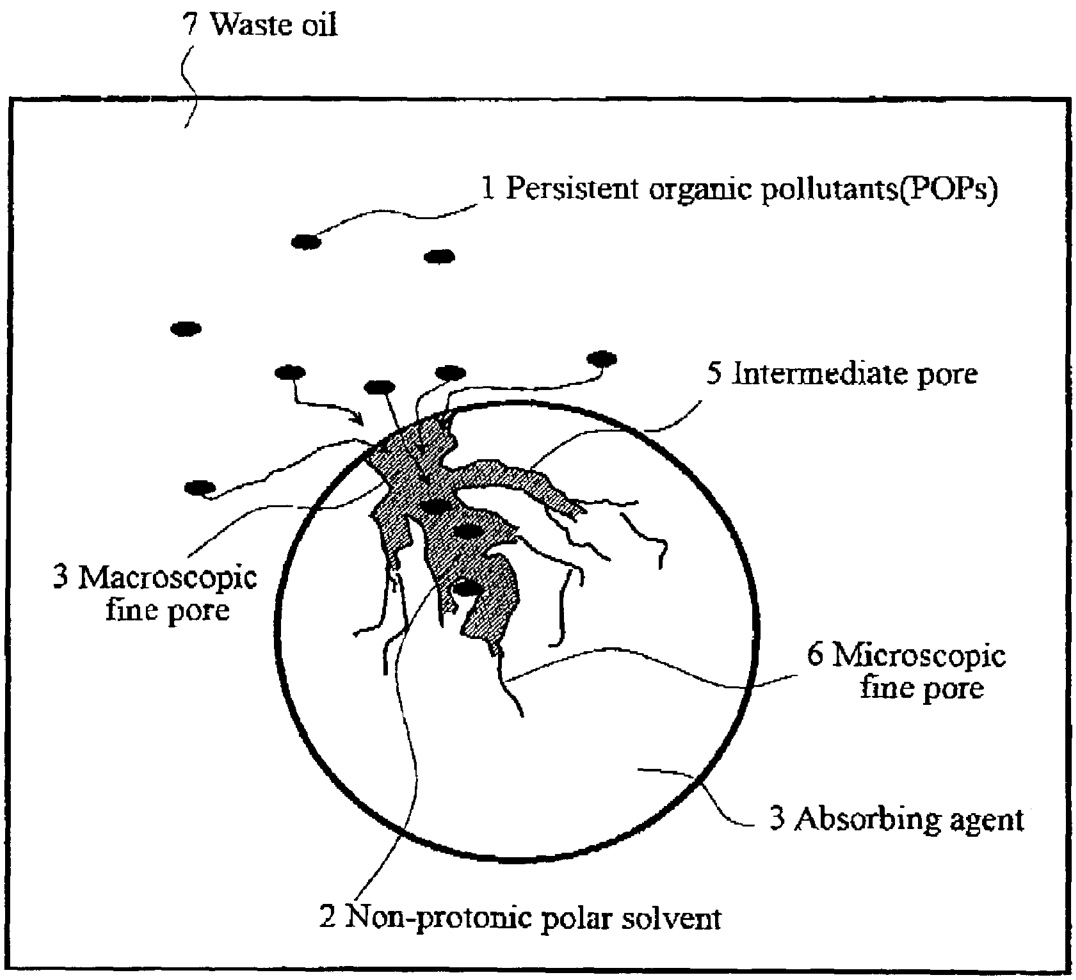
FIG. 1 is a view schematically showing adsorption of organic pollutants in a waste oil by an adsorbing agent onto which a non-protonic polar solvent is held, which is used in an embodiment of the first present invention.

An embodiment of the first invention will be explained below.

The first present invention is a method of treating a contaminated oil, which comprises contacting an adsorbing agent provided with a porous body and a non-protonic polar solvent held in the interior of fine pours in the porous body, with contaminated fats and oils containing organic pollutants, and adsorbing the pollutants in the non-protonic polar solvent in the porous body.

In the present embodiment, it is preferable that, as the non-protonic polar solvent, at least one selected from acetone, acetonitrile, N,N-dimethylformamide (DMF), dimethyl sulfoxide (DMSO), hexamethylephosphoramide (HMPA), tetrahydrofuran (THF), sulfolane, 1,3-dimethyl-2-intidazolidine (DMI), N-methyl-2-pyrrolidone (NMP) and propylene carbonate and an aqueous solution of the above solvent is used. Among these non-protonic polar solvents, in particular, 1,3-dimethyl-2-imidazolizine (DMI) is preferable. This is because it is excellent in the PCB extracting ability.

Further, in the present embodiment, it is preferable that, as the porous body, at least one material selected from charcoal, bone charcoal, active carbon, silica gel, fused silica, natural zeolite, synthetic zeolite, frass earth, activated clay, bauxite, alumina, magnesia, porous glass bead, chelating resin, chitosan and a polymer compound resin is used. Among these porous bodies, active carbon is particularly preferable. This is because it is easy to handle, is flexible, and can be easily prepared into porous bodies having a variety of shapes. Specifically, a porous body can be formed as a non-woven fabric or a woven fabric using a fibrous active carbon.

In the present embodiment, it is most preferable that 1,3-dimethyl-2-imidazolidine (DMI) or an aqueous DMI solution is adopted as the non-protonic polar solvent, and this is impregnated into active carbon for use.

In the present embodiment, examples of subject oils to be treated include animal and vegetable oils, essential oils, resin oils, mineral oils, electrical insulating oils such as transformer oils and condenser oils, cutting oils, lubricating oils, heat media, paints, food oils and fuel oils.

Materials which are suitable for application of the present invention as organic pollutants contained in the aforementioned oils are oils which are accumulated in animals and vegetables including human body, may probably have adverse effect thereon, and are difficult to be decomposed in the natural world, such as organic chlorinated compounds such as polychlorinated biphenyls, dioxins, furans, chlorden, heptachlor, aldrin, dieldrin, endrin, hexachlorobenzene, DDT, toxafen, mylex, hexachlorocyclohexane, pentachlorophenol and chlornitrofen.

According to this embodiment of the first invention, since a non-protonic polar solvent is held in fine pores of a porous body, and this non-protonic polar solvent has the low affinity with oils and the high affinity with organic pollutants, even persistent organic pollutants are selectively extracted into a non-protonic polar solvent and the non-protonic polar solvent is held in fine pours of a porous body. Thereafter, by separating a porous body from oils by simple work such as filtration, it becomes possible to remove a non-protonic polar solvent and organic pollutants together with a porous body from oils.

(First Embodiment)

An embodiment of the aforementioned first invention will be explained in detail below.

A method of treating a contaminated oil in the present embodiment is to continuously contact a waste oil into which organic pollutants at a maximum of around tens thousands ppm are mixed, with an adsorbing agent holding a non-protonic polar solvent at 20° C. to 80° C., and selectively adsorb and remove organic pollutants in a waste oil. Contact of a waste oil and an adsorbing agent may be performed a plurality of times.

In the present embodiment, a time for contacting a contaminated oil to be treated with an adsorbing agent is different depending on factors such as an amount of pollutants contained in a contaminated oil, a specific surface area of a porous adsorbing agent and a porous volume, and usually around 10 minutes to 48 hours is sufficient. When a contact step comprises a plurality of contacts, an accumulated contact time may be set to be in the aforementioned range.

In this adsorbing procedure, a way of procedure is not particularly limited, but the previously known continuous or batch methods such as a contact filtration method, a fluidized layer adsorbing method, a fixed layer adsorbing method and a moving layer adsorbing method can be used. Among these ways of procedure, it is preferable to adopt a contact filtration method. This is because a powdery or fine particulate adsorbing agent can be used, it is very easy to recover and handle an adsorbing agent, and when a fluid having the relatively high viscosity such as an electrical insulating oil is a subject to be treated, the efficacy is higher as compared with other adsorbing procedures. This contact filtration method is a method of mixing a powdery or fine particulate adsorbing agent into a contaminated oil, and stirring the mixture, whereby an adsorbing agent is suspended in an oil to promote adsorption, and an adsorbing agent is filtered after reaching equilibrium.

As a non-protonic polar solvent to be held in fine pores of a porous body in present embodiment, at least one or mixture of 2 or more selected from acetone, acetonitrile, dimethylacetamide, N,N-dimethylformamide (DMF), dimethyl sulfoxide (DMSO), hexamethylphosphoramide (HMPA), THF, sulfolane, 1,3-dimethyl-2-imidazolidine (DMI) and N-methyl-2-pyrrolidone (NMP) and aqueous solutions of these solvents can be used.

Further, as a porous body to be used in the present invention, at least one kind of material selected from charcoal, bone charcoal, active carbon, silica gel, fused silica, natural zeolite, synthetic zeolite, frass earth, activated clay, bauxite, alumina, magnesia, porous glass bead, chelating resin, chitosan and polymer synthetic adsorbing agent can be used. It is preferable that this adsorbing agent has a specific surface area of 100 to 3000 $m^2/g$ and a fine pore volume of 0.5 to 2.5 ml/g. When a specific surface area is below the aforementioned range, the content of a non-protonic polar solvent is reduced, and an amount or organic pollutants to be selectively adsorbed is reduced. On the other hand, when a specific surface area is above the aforementioned range, the mechanical strength of an adsorbing agent particle is reduced, and it becomes difficult to handle an adsorbing agent. In addition, when a fine pore volume is below the aforementioned range, the content of a non-protonic polar solvent is reduced. On the other hand, when a fine pore volume is above the aforementioned range, dissolution out of a non-protonic polar solvent at an adsorbing procedure is problematic, being not preferable.

In addition, an adsorbing agent is preferably particulate such that an average particle diameter is around 5 to 1000 μm. When an average particle diameter is below the aforementioned range, a particle is too fine and it becomes difficult to handle a particle, and further, a packing density of this adsorbing agent becomes higher, and it becomes difficult to contact an adsorbing agent with a contaminated oil to be used. On the other hand, when an average particle diameter is above the aforementioned range, since a packing density of an adsorbing agent to be packed into an adsorbing container is reduced, a treating apparatus becomes large size.

A process of preparing an adsorbing agent holding a non-protonic polar solvent used in the present embodiment is not particularly limited, but examples thereof include a method of impregnating a porous body with a non-protonic polar solvent, and a method of coating a non-protonic solvent on a porous body. Preferably, a non-protonic polar solvent is held throughout fine pores of a porous body by an impregnating process using the known vacuum impregnating apparatus. In this case, by injecting the aforementioned non-protonic polar solvent after the porous body is sufficiently deaerated and dehumidified in a vacuum tank, a solvent can be held throughout fine pores of a porous body. Note that an adsorbing agent after treatment is recovered by a suction filtering apparatus, and is dried in a room or mechanically at a temperature of 50° C. or lower. FIG. 1 shows a schematic cross-sectional view of the thus obtained adsorbing agent holding a non-protonic polar solvent used in the present embodiment. In FIG. 1, reference numeral 3 is a porous adsorbing agent particle, and this particle is composed of a comparatively large macroscopic fine pore 4, an intermediate pore 5 connecting to this macroscopic fine pore 4, and a microscopic fine pore 6 connect ng to this intermediate pore 5 and having the smallest pore diameter. A non-protonic polar solvent 2 is held in pores of these macroscopic fine pore 4, intermediate pore 5 and microscopic fine pore 6. This adsorbing agent 3 is dispersed in an untreated oil (waste oil) 7, and when contacted with the waste oil untreated oil 7, since organic pollutants 1 dispersed and dissolved in an untreated oil have the affinity with a non-protonic polar solvent, the adsorbing agent 3 enters through the macroscopic fine pore 4 and is adsorbed in fine pores.

Like this, by contacting a contaminated oil with an adsorbing agent holding a non-protonic polar solvent, it becomes possible to recover a waste oil which is an oil to be used with organic pollutants removed therefrom by adsorption, below the environmental standard concentration prescribed in Japan, and it becomes possible to reutilize the oil. In addition, organic pollutants adsorbed onto an adsorbing agent together with an adsorbing agent are subjected to combustion treatment, or pollutants are extracted from an adsorbing agent with a solvent which dissolves organic pollutants, and can be subjected to treatment of rendering harmless such as decomposition.

In the present embodiment, by chemically treating an adsorbing agent holding an non-protonic polar solvent in the present invention with an acid such as hydrochloric acid as necessary to decompose a non-protonic polar solvent, and further, by mixing the decomposed solvent with an organic solvent, adsorbed organic pollutants can be concentration-recovered into an organic solvent. The aforementioned organic solvent is not particularly limited, but a nonpolar solvent such as hexane, a lower alcohol such as 2-propanol or an organic solvent having a low-boiling point is preferably used.

In addition, an adsorbing agent after organic pollutants recovering treatment can be reused. That is, a kind and the concentration of an acid to be used for the aforementioned chemical treatment are not particularly limited because they vary depending on a kind of an adsorbing agent holding a non-protonic polar solvent to be used, but 1M to 5M hydrochloric acid is preferable.

(Modified Example of First Embodiment)

In an embodiment of the aforementioned first invention, a non-protonic polar solvent held by a porous adsorbing agent is used. However, the modified example is to treat a contaminated oil to be treated using, as the aforementioned adsorbing agent, a porous body in which the surface of the porous body carries a noble fine particle and a non-protonic polar solvent is held in the interiors of fine pores in the porous body.

That is, since organic pollutants are concentrated into a non-protonic polar solvent on the surface of and in fine pores of an adsorbing agent, by causing a porous body to carry a mixture of at least 1 or 2 or more selected front noble metals such as palladium (Pd) and rhodium (Rh) on the surface of and in fine pores of the adsorbing agent, the adsorbing agent can be employed as a noble metal fine particle-carrying adsorbing agent for treating of rendering organic pollutants in a waste oil harmless (treatment of rendering harmless by dechlorination). An amount or a noble metal to be carried upon this is not particularly limited, but 0.5 wt % to 10 wt % is preferable.

According to this modified example of the embodiment, since a noble metal fine particle is carried on the surface of and in pores of a porous adsorbing agent, organic pollutants selectively adsorbed in porous fine pores are decomposed by this catalyst, whereby adsorption of fresh organic pollutants into fine pores is further promoted, and further effective removal by adsorption becomes possible.

Further, organic pollutants can be effectively treated by adding active carbon on which a noble metal fine particle is carried after recovery to a reaction system in which an alkali such as sodium hydroxide and potassium hydroxide is dissolved in a lower alcohol such as 2-propanol, under the reaction conditions of nitrogen atmosphere and around 80° C.

[Regarding Second Invention]

Then, an embodiment of the second present invention will be explained. This embodiment was done as a result of extensive study regarding the technique of recovering an aromatic halogenated compound contained in fats and oils by a step of selectively adsorbing and separating an aromatic halogenated compound in fats and oils by contacting continuously fats and oils containing an aromatic halogenated compound such as PCB with an adsorbing agent, and a step of extracting and concentrating the aromatic halogenated compound from the adsorbing agent into an organic solvent.

That is, this embodiment of the second invention is a method of treating fats and oils, which Comprises an adsorbing step of contacting fats and oils containing an aromatic halogenated compound with an adsorbing agent comprising a solid acid to adsorb the aromatic halogenated compound onto the adsorbing agent, and a step of contacting the adsorbing agent with an organic solvent to extract the aromatic halogenated compound adsorbed onto the adsorbing agent into the organic solvent.

In this embodiment, contaminated fats and oils containing an aromatic halogenated compound can be acid-treated before the aforementioned adsorbing step. Thereby, polar materials which inhibit adsorption of an aromatic halogenated compound contained in fats and oils can be decomposition-treated.

Further, in the aforementioned present invention, it is desirable that acidity of the solid acid (Lewis acid+Brønsted acid) is not less than 0.1 mmol/g and not more than 1 mmol/g, and acidity of the solid acid (Lewis acid+Brønsted acid) is not more than +4.0.

In addition, in the aforementioned present invention, it is desirable that the solid acid is at least one selected from metal oxide, metal silicon composite oxide, metal sulfide, metal chloride, sulfate, phosphate, silicate, synthetic zeolite (molecular sieve), silica gel, heteropolyacid, active carbon, clay mineral, $H_3PO_4$-containing diatomaceous earth and cationic exchange resin.

As fats and oils which can be treated in the present invention, any fats and oils can be treated as far as they are fats and oils which maybe derived from any origin and are liquid at a normal temperature or become liquid by heating, such as mineral oils, vegetable oils and animal oils which are contaminated with an aromatic halogenated compound. More specifically, examples thereof include mineral oils such as petroleum, light oil and heavy oil, vegetable oils such as olive oil, cotton seed oil, rapeseed oil, linseed oil, coconut oil and tung oil, and animal oils such as beef tallow, born oil, whale oil, fish oil and cod-liver oil.

Further, the present embodiment can be also applied to fats and oils which become liquid at a temperature of around 100° C. Specifically, examples thereof include wax and shortening.

These fats and oils contain fatty acid glycerin triester as a main ingredient and contain free fatty acid, long chain alcohol and hydrocarbon as an ingredient.

These fats and oils are used as electric insulating oils such as transformer oils and condenser oils, cutting oils, lubricating oils, heat media, paints, food oils and fuel oils.

An amount of a pollutant contained in these fats and oils is suitably in a range of 0.5 ppm to 10000 ppm. When the content of a pollutant is below the aforementioned range, a recovery efficacy per unit time is reduced, being not practical. On the other hand, when the content of a pollutant is below the aforementioned range, a recovery rate is reduced, and long time treatment is required in order that the pollutant concentration is reduced to a desired range, being not practical.

A pollutant which is suitable to be used in the present embodiment is a material which is an aromatic halogenated compound, is flame-retardant, is riot decomposed in the natural world, and may have influence on animals and plants. Specifically, examples thereof include polychlorinated biphenyls, polychlorinated dibenzoparadioxins (PCDDs), polychlorinated dibenzofurans (PCDFs) and hexachlorobenzene (HCB).

(Second Embodiment)

A second embodiment will be explained in detail below. A treating method of the present embodiment comprises a step of adsorbing an aromatic halogenated compound and a step of extracting an aromatic halogenated compound.

1. Adsorbing Step

The first step is a step of contacting fats and oils contaminated with an aromatic halogenated compound with an adsorbing agent comprising a solid acid to selectively adsorb the aromatic halogenated compound onto the adsorbing agent.

That is, for example, fats and oils such as a mineral oil containing 0.5 ppm to a few thousands ppm polychlorinated biphenyl is continuously contacted with a solid acid to selectively adsorb an aromatic halogenated compound such as polychlorinated biphenyls onto an adsorbing agent.

A treating temperature in this adsorbing step is preferably in a range of 20° C. to 100° C. When an adsorbing temperature is below this range, not only the viscosity of fats and oils is increased and it becomes difficult to handle, but also since the flowability of fats and oils is lost, a rate of removing aromatic halogenated compound pollutants is reduced. On the other hand, when the temperature is above the aforementioned range, degeneration such as oxidation of fats and oils and evaporation of an aromatic halogenated compound occur, and it becomes difficult to control the treatment environment.

An adsorbing time for contacting fats and oils to be treated with an adsorbing agent is different depending on factors such as the viscosity of fats and oils, a ratio of mixing fats and oils to be treated with an adsorbing agent and the nature of the surface of an adsorbing agent, but is usually selected from a range of around 30 minutes to 48 hours. When an adsorbing time is below this range, an aromatic halogenated compound removing rate is reduced. On the other hand, when an adsorbing time is above this range, the effect of improving a removing rate is not seen for a necessary step time, being uneconomical.

The adsorbing procedure is not particularly limited, but the known continuous batch methods such as a contact filtration method, a fluidized adsorbing method, a fixed layer adsorbing method and a moving layer adsorbing method can be used.

When adsorbing treatment is performed by a continuous manner, fats and oils to be treated are placed ii a container packed with an adsorbing agent, and treatment can be performed while contacting an adsorbing agent with fats and oils to be treated. In addition, when adsorbing treatment is performed by a batch manner, an adsorbing agent is disposed in a container, fats and oils to be treated are added to this container, and an adsorbing agent and fats and oils to be treated are contacted and adsorbed for a predetermined time while performing stirring by a stirring apparatus as necessary. In any method, adsorption of an aromatic halogenated compound occurs by contact of an adsorbing agent with fats and oils to be treated, and therefore, it is important to maintain and control the procedure so as to promote contact.

(Adsorbing Agent Material)

An adsorbing agent used in this embodiment contains a solid acid, and a solid acid functions as a proton donor or an electron acceptor, whereby the adsorbing agent selectively adsorbs an aromatic halogenated compound.

Specifically, solid acids such as metal oxide, metal silicon composite oxide, metal sulfide, metal chloride, sulfate, phosphate, silicate, synthetic zeolite (molecular sieve), silica gel, heteropolyacid, active carbon, clay mineral, $H_3PO_4$-containing diatomaceous earth and cationic exchange resin can be used. These solid acids may be used alone, or a plurality of solid acids may be used by mixing them.

As the metal oxide, alumina and magnesium oxide are suitable. As the metal silicon composite oxide, silica magnesia, silica boria, silica nickel oxide and silica zirconia are suitable. As the metal sulfide, zinc sulfide (ZnS) is suitable. As the metal chloride, aluminium chloride and copper chloride are suitable. As the sulfate, nickel sulfate and copper sulfate are suitable. Further, as the phosphate, aluminium phosphate and titanium phosphate are suitable. In addition, as the silicate, potassium silicate, cesium silicate, calcium silicate and magnesium silicate are suitable. As the clay mineral, acid clay and montmorillonite are suitable.

In the solid acid, acidity and acid strength can be regulated by performing suitable surface modifying treatment. For example, in the case of zeolite, an amount of Brønsted acid points and an amount of Lewis acid points can be regulated by heat treatment. (200° C. to 900° C.). In the case of active carbon, a sulfone group or a cationic exchange group (surface acidic active group such as phenolic hydroxyl group and carboxyl group) can be introduced on the surface by sulfonation or nitric acid oxidation. Alternatively, an acidic group can be produced to the same extent as that of concentrated nitric acid treatment also by air oxidation at 400° C.

Regardless of a material, it is desirable that acidity of the solid acid (Lewis acid+Brønsted acid) is in a range of not less than 0.1 mmol/g and not more than 1 mmol/g, and a value of acid strength of the solid acid (Lewis acid+Brønsted acid) is not more than +4.0.

This acidity is a measured number of acid points or acidic centers of the solid surface, and can be measured by titrating the solid acid in a nonpolar solvent with amines.

In addition, this acid strength is the ability of acid points of the solid surface of donating a proton to a base or the ability of receiving an electron pair from a base, and can be measured by using various acid base converting indicators, Pkas of which are known.

When acidity of the adsorbing agent is below the above range, there is a problem on remarkable reduction in an adsorbing efficacy. On the other hand, when acidity of an adsorbing agent exceeds the above range, there may arise a problem on reduction in the selective adsorbing ability due to a competitive adsorbing reaction between coexisting ingredients in fats and oils and an aromatic chlorinated compound. In addition, when the acid strength of an adsorbing agent is below the above range, there may arise a problem on reduction in the polar interaction with a base in an aromatic chlorinated compound, that is, reduction in the adsorbing strength.

(Structure of Adsorbing Agent)

It is preferable that an adsorbing agent used in the present embodiment has an average particle diameter in a range of 10 to 1000 $\mu$m and is particulate. When an average particle diameter is below the above range, not only handling is difficult but also contact between an adsorbing agent and fats and oils to be treated becomes difficult in adsorbing treatment and the recovery efficacy may be reduced. On the other hand, when an average particle diameter exceeds the above range, there is a tendency that a specific surface area of an adsorbing agent is reduced, and a necessary amount of an adsorbing agent for treating a required volume of fats and oils is increased.

Further, it is preferable that the surface of an adsorbing agent is porous A preferable specific surface area is in a range of 10 to 3000 $m^2/g$. When this specific surface area is below the above range, the adsorbing efficacy is reduced. On the other hand, when a specific surface area exceeds the above range, since it is extremely difficult to prepare such an adsorbing agent as compared with an adsorbing agent having a specific surface area in the above range, the adsorbing agent lacks the versatility. In addition, the mechanical strength of an adsorbing agent is reduced, and the workability is deteriorated, being not preferable.

It is preferable that magnesium silicate is used is the case of polychlorinated biphenyls having a small number of chlorine substitution, and active carbon is used in the case of polychlorinated biphenyls having the planar structure.

(Nature of Treated Fats and Oils)

By separating an adsorbing agent and fats dad oils to be treated after adsorbing treatment is performed in this step, it becomes possible to remove an aromatic halogenated compound in fats and oils to be treated to nor more than the environmental standard concentration (not more than 0.5 mg-PCB/kg-oil) in Japan, and it becomes possible to recover and reutilize fats and oils such as mineral oils as a non-contaminated oil. Use of reutilization is not limited to use in fuel oils, but a non-contaminated oil can be utilized also as an electric insulating oil by purification treatment.

Note that a solid adsorbing agent and liquid fats and oils to be treated can be separated at a high precision by simple work such as filtration.

2. Extracting Step

After separation from fats and oils to be treated, an adsorbing agent which was used in treatment in an adsorbing step is treated with an organic solvent, and an aromatic halogenated compound is separated from an adsorbing agent, whereby an aromatic halogenated compound can be extracted.

In this step, an adsorbing agent with an aromatic halogenated compound adsorbed thereon and an organic solvent are contacted to dissolve an aromatic halogenated compound adsorbed on an adsorbing agent with an organic solvent, and as a result, an aromatic halogenated compound is separated from an adsorbing agent. In this extracting step, the known continuous or batch extracting apparatuses such as Soxhlet's extractor can be used. It is preferable from a viewpoint of the extracting efficacy that a time of contact between an adsorbing agent and an organic solvent is in a range of 5 minutes to 2 hours. An aromatic halogenated compound can be concentrated by evaporating an organic solvent in which an aromatic halogenated compound after extraction is dissolved. Note that it is desirable to remove an adsorbing agent from an organic solvent before evaporation of an organic solvent.

An organic solvent used in the present embodiment is not particularly limited as far as it dissolves a halogenated compound, but inert nonpolar solvents such as hexane and petroleum ether, non-protonic polar solvents such as acetone, acetonitrile, dimethyl sulfoxide (DMSO) and N, N-dimethylformide (DMF), and lower alcohols such as ethanol, methanol, propanol, 2-propanol, butanol and 2-butanol can be used. The above solvents may be used alone, or 2 or more may be used by mixing them. It is preferable to use an organic solvent having a low boiling point by which an aromatic halogenated compound after recovery is easily concentrated.

By this step, an aromatic halogenated compound on an adsorbing agent is extracted and concentrated by an organic solvent, and can be recovered in an organic solvent at the concentration of around a few t to 30%. Since the thus obtained aromatic halogenated compound has the high concentration, it can be effectively combusted by the known method, or can be rendered harmless by a chemical decomposition method.

(Modified Example of Embodiment of the Second Invention)

A modified example of an embodiment of the second in invention is to perform pre-treatment with an acid prior to adsorbing treatment and extracting treatment in the embodiment of the aforementioned second invention. That is, prior to the above adsorbing step, fats and oils to be treated are chemically treated with concentrated sulfuric acid, mixed acid (mixture of concentrated sulfuric acid and concentrated nitric acid) or a mixture of fuming sulfuric acid and concentrated sulfuric acid.

By performing this chemical treatment, polar materials such as pigment ingredients, oxidized fats and oils, polycyclic aromatic hydrocarbons, unsaturated hydrocarbons and phthalic acid esters which are produced mainly by deterioration of fats and oils and can inhibit adsorption of an aromatic halogenated compound can be decomposition-treated. That is, an aromatic halogenated compound in fats and oils which have been deteriorated considerably by long term use or long time storage can be also effectively adsorption-treated. Further, chemical treatment with a mixed acid (concentrated sulfuric acid+concentrated nitric acid) or finning sulfuric acid induces nitration or sulfonation of an aromatic halogenated compound. By addition of a nitro group or a sulfonic group to an aromatic halogenated compound, the polarity interaction with an adsorbing agent is potentiated, and improvement in the efficacy of adsorbing an aromatic halogenated compound in fats and oils becomes possible.

A ratio of mixing the concentrated sulfuric acid and concentrated nitric acid and the concentration of fuming sulfuric acid are not particularly limited, but a mixed acid having a volumetric ratio of concentrated sulfuric acid and concentrated nitric acid of 1:1 to 3:1, and fuming sulfuric acid which is 6 to 8% of sulfur trioxide diluted with concentrated sulfuric acid are preferable.

Nitration and sulfonation of an aromatic halogenated compound by this pre-treatment are particularly effective to adsorption of a highly chlorinated aromatic halogenated compound having the low deviated polarity among aromatic halogenated compounds.

This pre-treatment is performed by mixing and stirring fats and oils to be treated and an acid. A pre-treatment time is suitably 10 minutes to 1 hour in addition, a temperature is preferably in a range of 10° C. to 60° C. A ratio of mixing is preferably in a range of 1 to 20 parts by mass of the aforementioned acid relative to 100 parts by mass of fats and oils.

In the modified example of the present embodiment, after acid treatment as pre-treatment, fats and oils to be treated and a mixed acid are separated by means such as allowing to stand, and an acid remaining in fats and oils such as mineral oils is removed by washing with pure water and dehydration treatment.

Thereafter, according to the same manner as that of the aforementioned embodiment of the second present invention, adsorbing treatment and extracting treatment can be performed.

EXAMPLES

The following Examples illustrate the present invention in more detail but do not limit the present invention.

Example 1

A test of removal-treating low concentration polychlorinated biphenyls in an electric insulating oil will be explained below.

In the present Example, removal of pollutants from a waste oil was performed by a contact filtration method under the following test conditions.

That is, as a waste oil which is a subject to be treated, a sample obtained by adding 0.096 g of polychlorinated biphenyls (KC300) to 200 g of an electric insulating oil (mineral oil) was used. This corresponds to 480 ppm in terns of the concentration of polychlorinated biphenyls.

In addition, as an adsorbing agent, 1 g of active carbon was used in which 1,3-dimethyl-2-imidazoline (DMI) was held in a powdery active carbon matrix having a specific surface area of 938 $m^2/g$ and a fine pore volume of 1.1 $cm^2/g$.

A reaction was carried out at a temperature of 25° C. for 24 hours under normal pressure.

Preparation of Active Carbon Holding DMI and Silica Gel Holding DMI

A pressure of a closed container in which a constant amount of the aforementioned active carbon was placed was reduced, and thereafter, 50 ml of the aforementioned 1,3-dimethyl-2-imidazoline (DMI) was injected until active carbon was completely immersed. After allowing to stand for 24 hours, DMI was separated by filtration, which was dried for 5 hours with a dryer set at 40° C.

Further, silica gel holding DMI was prepared in the same manner as described above.

Adsorbing Test 200 g of polychlorinated biphenyls-containing electric insulating oil and 1 g of an adsorbing agent were added to a three-necked flask in a constant temperature water bath regulated at 25° C., and the mixture was sufficiently stirred (300 rpm or more) using a stirrer. After stirred for 24 hours, an adsorbing agent and an insulating oil were solid liquid-separated with a suction filtrating apparatus, and the concentration of polychlorinated biphenyls in an electric insulating oil was measured by gas chromatography equipped with a high resolution mass analyzer.

As a result, it was found that a rate of adsorption-removing polychlorinated biphenyls in an electric insulating oil is dramatically improved by an adsorbing agent holding DMI. That is, it was made clear that when an adsorbing agent holding a non-protonic polar solvent is used, adsorption-removal of low concentration polychlorinated biphenyls from an electric insulation oil is dramatically improved as compared with no use of a non-protonic polar solvent. Note that a rate of recovering an electric insulating oil by solid-liquid separation was 99.9% or more.

Examples 2 and 3

A test of removal-treating low concentration polychlorinated biphenyls in an electric insulating oil will be explained.

In the present Example, removal of pollutants from a waste oil was performed by a contact filtration method under the following test conditions.

That is, as a waste oil which is a subject to be treated, a sample obtained by adding 0.096 g of polychlorinated biphenyls (KV300) to 200 g of an electric insulating oil (mineral oil) was used. This corresponds to 480 ppm in terms of the concentration of polychlorinated biphenyls.

Further, as an adsorbing agent, 1 g of active carbon was used in which dimethyl sulfoxide (DMSO) was held by a powdery active carbon matrix having a specific surface area of 938 $m^2/g$ and a fine pore volume of 1.1 $cm^2/g$ (Example 2).

Furthermore, as an adsorbing agent in another Example, 1 g of silica gel was used in which dimethyl sulfoxide (DMSO) was held by a silica gel matrix having a specific surface area of 450 $m^2/g$ and a fine pore volume 0.8 $cm^2/g$ (Example 3).

A reaction was carried out at a temperature of 25° C. for 24 hours under normal pressure.

Preparation of Active Carbon Holding DMSO and Silica Gel Holding DMSO

A pressure of a closed container in which a constant amount of the aforementioned active carbon was placed was reduced, and thereafter 50 ml of the aforementioned dimethyl sulfoxide (DMSO) was injected until active carbon was completely immersed. After allowing to stand for 24 hours, DMSO was separated by filtration, which was dried for 5 hours with a dryer set at 40° C.

In addition, silica gel holding DMSO was prepared in the same manner as described above.

Adsorbing Test 200 g of polychlorinated biphenyls-containing electric insulating oil and 1 g of an adsorbing agent were added to a three-necked flask in a constant temperature water bath regulated at 25° C., and the mixture was sufficiently stirred (300 rpm or more) using a stirrer. After stirred for 24 hours, an adsorbing agent and an insulating oil were solid liquid-separated by a suction filtrating apparatus, and the concentration of polychlorinated biphenyls in an electric insulating oil was measured by gas chromatography equipped with a high resolution mass analyzer.

Figure 2:
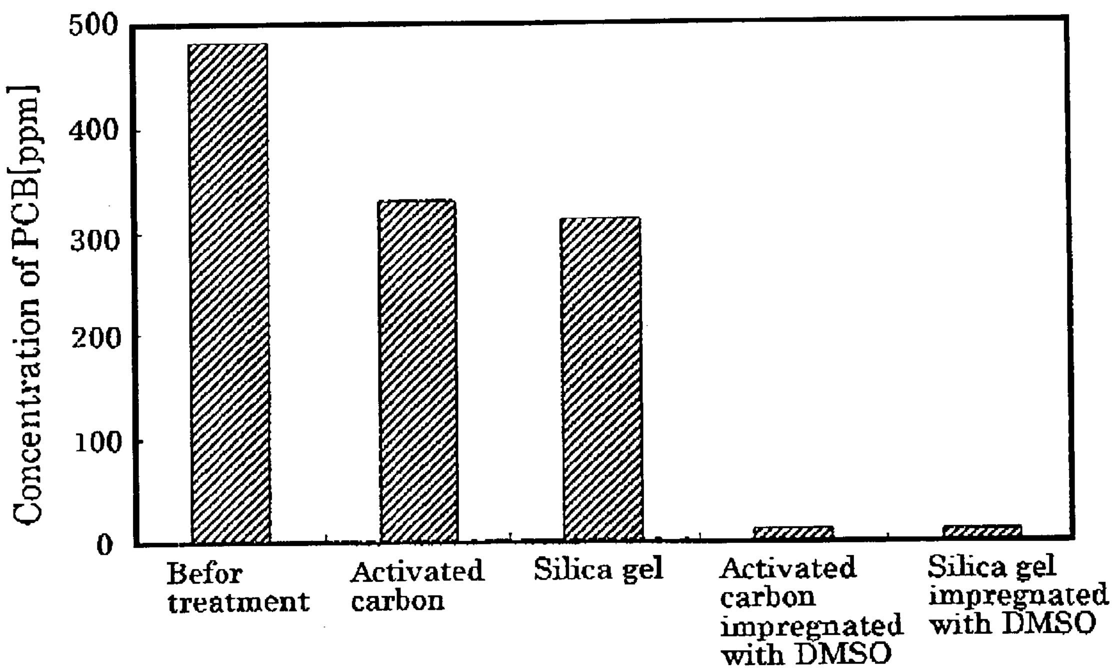
FIG. 2 is a graph showing the ability of adsorbing low concentration polychlorinated biphenyls in an insulating oil of an adsorbing agent onto which DMSO is held, which is one example of the present invention.

Representative experimental results are shown in FIG. 2. From the following results, a rate of adsorption-removing polychlorinated biphenyls in an electric insulating oil is dramatically improved by an adsorbing agent holding DMSO.

Adsorption removal of low concentration polychlorinated biphenyls from an electric insulating oil was effectively accomplished using an adsorbing agent holding a non-protonic polar solvent.

Note that a rate of recovering an electric insulating oil by solid-liquid separation was 99.9% or more in each Example.

Comparative Examples 1 and 2

A waste oil was treated according to the same manner as that of Example 1 except that, as an adsorbing agent, 1 g of powdery active carbon (specific surface area=938 $m^2/g$, fine pore volume=1.1 $cm^2/g$) (Comparative Example 1) and 1 g of silica gel (specific surface area=450 $m^2/g$, tine pore volume=0.8 $cm^2/g$) (Comparative Example 2) were used.

The results are also shown in Table 1.

TABLE 1

| | Adsorbing agent | Specific surface area $m^2/g$ | Fine pore volume $cm^2/g$ | Non-protonic polar solvent | Adsorption removal rate |
|---|---|---|---|---|---|
| Example 2 | Powdery active carbon | 938 | 1.1 | DMSO | 97.5% |
| Example 3 | Silica gel | 450 | 0.8 | DMSO | 97.3% |
| Comparative Example 1 | Powdery active carbon | 938 | 1.1 | | 9.3% |
| Comparative Example 2 | Silica gel | 450 | 0.8 | | 8.4% |

As apparent from the results of Table 1, it was found that, when an adsorbing agent treated with a non-protonic polar solvent in the present invention is used, a rate of adsorption-removing organic pollutants is considerably improved as compared with use of an adsorbing agent undergoing no such treatment.

Example 4

5 ng of a palladium particle having an average particle diameter of 0.1 μm was deposited on 92 g of powdery active carbon (specific surface area of 938 $m^2/g$, fine pore volume of 1.1 $cm^2/g$) used in Example 2. Thereafter, in the same manner as in Example 2, a mineral oil containing polychlorinated biphenyls was treated. Recovered palladium-carrying active carbon was added to 500 ml of a solution in which 125 $mmol/dm^{-3}$ of sodium hydroxide was dissolved in 500 ml of 2-propanol, which was subjected to rendering harmless treatment at a temperature of 80° C. while stirring with a stirrer under nitrogen atmosphere. As a result, PCB decomposition rate of 99.9999% was accomplished at a reaction time of 1 hour.

In this Example, a palladium noble metal fine particle was carried on an adsorbing agent as follows.

That is, palladium chloride was dissolved in concentrated hydrochloric acid and water, water was further added to dilute the solution, and thereafter, the dilution was mixed with carbon well, and was dried to solidify while stirring sometimes. This solid was converted into a powder, and stored in a closed container. By a method of reducing a necessary amount of a noble metal by shaking with hydrogen in a solvent, a noble metal fine particle carrying an adsorbing agent which is suitable for using in the present Example could be prepared. In addition, when it is necessary to remove produced hydrochloric acid, an adsorbing agent is filtered while maintaining the state of wet noble metal fine particle, and is washed with a solvent for use Example 5

The present Example comprises A: adsorbing treatment and B: extracting treatment, and both treatments were performed using a contact filtrating method under the following test conditions.

First, as a subject to be treated, a subject sample to be treated was prepared by mixing 200 g of an electric insulating oil (mineral oil) and 0.096 g of PCB (KC-300) (the concentration of polychlorinated biphenyls corresponds to 480 ppm). Then, as an adsorbing agent, 3 g of magnesium silicate (particle diameter of 200 μm, specific surface area of 130.6 $m^2/g$) was washed with hexane, and activated by drying at 120° C. for 4 hours, which was used. A reaction temperature was 25° C., and a reaction pressure was normal pressure. In addition, a reaction time was such that an adsorption treating time was 48 hours and an extraction treating time was 2 hours.

A: Adsorption Treatment 200 g of a PCB-containing electric insulating oil and 3 g of magnesium silicate were added to a three-necked flask in a constant temperature water bath regulated at 25° C., and the mixture was sufficiently stirred at a stirring rate of 300 rpm or higher using a stirrer. After stirred for 48 hours, magnesium silicate and an insulating oil were solid liquid-separated with a suction filtrating apparatus to recover 99.9% or more of a liquid ingredient (insulating oil) In addition, 10 ml of an insulating oil was taken, and the concentration of polychlorinated biphenyls in an insulating oil was measured by gas chromatography equipped with a high resolution mass analyzer.

B: Extraction Treatment

Magnesium silicate recovered by suction filtration was added to 100 ml of n-hexane in a flask, and the mixture was sufficiently stirred for 2 hours by a shaking stirrer. After stirring, magnesium silicate and n-hexane were separated with a suction filtrating apparatus, and the concentration of polychlorinated biphenyls in n-hexane was measured by gas chromatography equipped with a high resolution mass analyzer.

Figure 3:
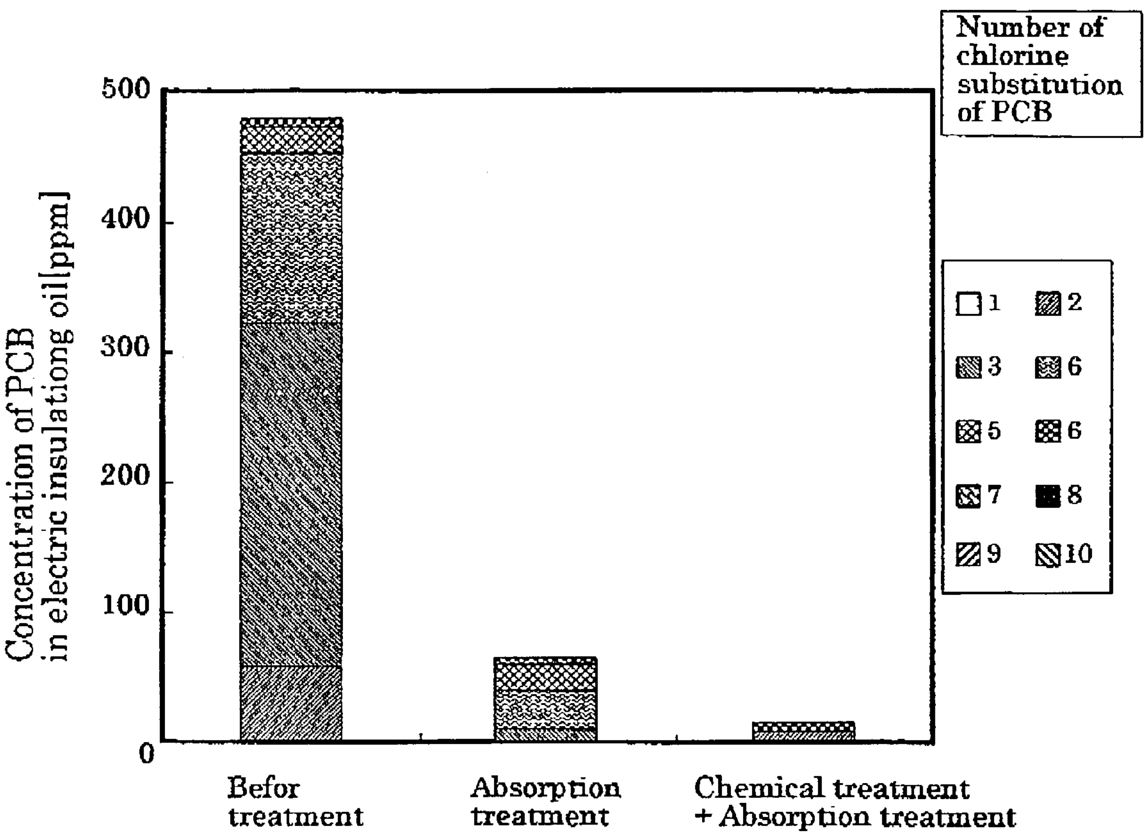
FIG. 3 is a graph showing the effect of removing PCB in accordance with another example of the present invention.

The experimental results of the present Example are shown in FIG. 3 and Table 2. From this result, a rate of removing polychlorinated biphenyls in an insulating oil reaches 87% by adsorption by magnesium silicate, and thus, the effectiveness of magnesium silicate in adsorption of polychlorinated biphenyls in an insulating oil was confirmed.

A removal rate in Table 2 is a ratio of an amount of an aromatic halogenated compound pollutant contained in fats and oils to be treated, and an amount obtained by subtracting an amount of a pollutant remaining in fats and oils after treatment from an amount of a pollutant before this treatment, that is, an amount of a pollutant removed by treatment of the present invention. In addition, a recovery rate is a ratio of an amount of a pollutant contained in an organic solvent after treatment, and an amount of a pollutant contained in fats and oils to be treated before treatment.

Examples 6 to 8

According to tile same treatment conditions as those of Example 5 except that silica alumina having acidity and acid strength in a range of the present invention was used, adsorption treatment and extraction treatment were carried out using a polychlorinated biphenyls-containing waste oil.

Examples 9 to 10

According to the same treatment conditions as those of Examples 5 to 8 except that an adsorbing agent was variously changed, adsorption treatment and extraction treatment were carried out using a polychlorinated biphenyls-containing waste oil. Adsorbing agents used in these Comparative Examples are shown in Table 2. As a result, as shown in Table 2, it was found that, when adsorbing agents having acidity and acid strength not in a range of the present invention are used, rates of removing an aromatic halogenated compound in fats and oils to be treated are all slightly under the results of Examples 5 to 8.

TABLE 2

| | Solid acid | Acidity | Acid strength | Removal rate | Recovery rate |
|---|---|---|---|---|---|
| Example 5 | Magnesium silicate | 0.85 mmol/g | <+4.0 | 87.5% | 97.2% |
| Example 6 | Silica alumina | 0.34 mmol/g | <−8.2 | 85.8% | 98.3% |
| Example 7 | Silica alumina | 0.1 mmol/g | <+4.0 | 82.5% | 97.5% |
| Example 8 | Silica alumina | 1 mmol/g | <−5.6 | 85.3% | 95.6% |
| Example 9 | Nickel sulfate | 0.72 mmol/g | +6.8 to +4.8 | 55.5% | 85.2% |
| Example 10 | Silica alumina | 0.05 mmol/g | <−5.6 | 61.0% | 86.3% |

Example 11

According to the same manners as those of the aforementioned Examples 5 to 10, adsorption treatment and extraction treatment were carried out using a polychlorinated biphenyls-containing insulating oil which had been subjected to mixed acid treatment, as pre-treatment prior to an adsorption step.

For chemical treatment with a mixed acid, 40 ml of a mixed acid (30 ml of concentrated sulfuric acid+10 ml of concentrated nitric acid) was added to the aforementioned polychlorinated biphenyls-containing insulating oil, the mixture was shaken with a separating funnel., and the procedure was continued until a mixed acid turned pale yellow (about 20 minutes). Here, since a miner amount of a mixed acid remained in an insulating oil after mixed acid separation, an insulating oil was subjected to washing with pure water and dehydration treatment with anhydrous sodium sulfate. Note that it was confirmed that all the concentrations of polychlorinated biphenyls in pure water and a mixed acid after use satisfied the environmental standard.

By mixed acid treatment as pre-treatment for this adsorption step, a rate of removing polychlorinated biphenyl in an insulating oil reached 97%. Since a rate of removing polychlorinated biphenyls having the number of chlorine substitution of 4 or more is improved, it was shown that inhibition removal and nitration of polychlorinated biphenyls by pre-treatment are particularly effective for adsorption of high chlorinated polychlorinated biphenyls.

A rate of recovering polychlorinated biphenyls is also high as 95% or more under both conditions of "adsorption treatment" and "chemical treatment+adsorption treatment", and thus, concentration and recovery of polychlorinated biphenyls in an insulating oil by the present invention were confirmed.

These results are shown by a graph in FIG. 3. FIG. 3 shows the results of measurement of the concentration of PCB contained in an electric insulating oil, the concentration of PCB contained in an electric insulating oil subjected to adsorption treatment, and the concentration of PCB contained in an electric insulating oil subjected to chemical treatment which is acid treatment. Numerical values of 1 to 10 in the figure indicate the number of chlorine substitution of contained PCB. As apparent from this result, it was made clear that PCB was effectively removed from an insulating oil by treatment of the present invention.

INDUSTRIAL APPLICABILITY

According to the present invention, aromatic halogenated compound pollutants can be effectively removed from fats and oils containing pollutants comprising low concentration aromatic halogenated compounds by a simple method, and pollutants can be recovered at the high concentration, and thus, the present invention is an excellent method as a method of cleaning the environmental pollution and has the high industrial value.

What is claimed is:

1. A method of treating fats and oils, which comprises contacting an adsorbing agent comprising a porous body that carries noble metal fine particles and has a non-protonic polar solvent held in interiors of fine pores in the porous body, with contaminated fats and oils comprising organic pollutants, and adsorbing the pollutants in the non-protonic polar solvent in the porous body.

2. The method of treating fats and oils according to claim 1, wherein the noble metal particles carried by the porous body are carried in a range of 0.5 to 10 wt % relative to the porous body.

3. The method of treating fats and oils according to claim 1, wherein the non-protonic polar solvent is at least one kind selected from acetone, acetonitrile, N,N-dimethylformamide (DMF), dimethyl sulfoxide (DMSO), hexamethylphosphoramide (HMPA), tetrahydrofuran (THF), sulfolane, 1,3-dimethyl-2-imidazolidine (DMI), N-methyl-2-pyrrolidone (NMP) and propylene carbonate and aqueous solutions thereof.

4. The method of treating fats and oils according to claim 3, wherein the porous body has a specific surface area in a range of 100 to 3000 $m^2/g$.

5. The method of treating fats and oils according to claim 1, wherein the porous body comprises at least one kind of material selected from charcoal, bone charcoal, active carbon, silica gel, fused silica, natural zeolite, synthetic zeolite, frass earth, activated clay, bauxite, alumina, magnesia, porous glass earth, activated clay, bauxite, alumina, magnesia, porous glass bead, chelating resin, chitosan and polymer compound resin.

6. The method of treating fats and oils according to claim 5, wherein the active carbon is fibrous active carbon.

7. The method of treating fats and oils according to claim 1, wherein the non-protonic polar solvent is 1,3-dimethyl-2-imidazolidine, and a porous body holding the same is active carbon.

8. A method of treating fats and oils, which comprises contacting an adsorbing agent comprising a porous body and a non-protonic polar solvent held in interiors of fine pores in the porous body, with contaminated fats and oils comprising organic pollutants, and adsorbing the pollutants in the non-protonic polar solvent in the porous body, wherein the porous body holding a non-protonic polar solvent which has adsorbed pollutants by contact with the fats and oils is treated using an acid, and thereafter, the porous body is treated with an organic solvent selected from a non-polar solvent and a lower alcohol, whereby, the pollutants are dissolved in the organic solvent.

9. The method of treating fats and oils according to claim 8, wherein the non-protonic polar solvent is at least one kind selected from acetone, acetonitrile, N,N-dimethylformamide (DMF), dimethyl sulfoxide (DMSO), hexamethylphosphoramide (HMPA), tetrahydrofuran (THF), sulfolane, 1,3-dimethyl-2-imidazolidine (DMI), N-methyl-2-pyrrolidone (NMP) and propylene carbonate and aqueous solutions thereof.

10. The method of treating fats and oils according to claim 8, wherein the porous body comprises at least one kind of material selected from charcoal, bone charcoal, active carbon, silica gel, fused silica, natural zeolite, synthetic zeolite, frass earth, activated clay, bauxite, alumina, magnesia, porous glass earth, activated clay, bauxite, alumina, magnesia, porous glass bead, chelating resin, chitosan and polymer compound resin.

11. The method of treating fats and oils according to claim 8, wherein the porous body has a specific surface area in a range of 100 to 3000 $m^2/g$.

12. The method of treating fats and oils according to claim 8, wherein the non-protonic polar solvent is 1,3-dimethyl-2-imidazolidine, and a porous body holding the same is active carbon.

13. The method of treating fats and oils according to claim 12, wherein the active carbon is fibrous active carbon.

14. The method of treating fats and oils according to claim 8, wherein the adsorbing agent comprising a porous body and a non-protonic polar solvent held in interiors of fine pores in the porous body further carries noble metal particles.

15. The method of treating fats and oils according to claim 14, wherein the noble metal particles carried by the porous body are carried in a range of 0.5 to 10 wt % relative to the porous body.

* * * * *